(12) United States Patent
Su et al.

(10) Patent No.: US 12,026,186 B2
(45) Date of Patent: Jul. 2, 2024

(54) MANAGING QUERY SYSTEMS FOR RESPONDING TO QUERIES BASED ON ATTRIBUTES ASSOCIATED WITH A GIVEN QUERY

(71) Applicant: INTERNATIONAL BUSINESS MACHINES CORPORATION, Armonk, NY (US)

(72) Inventors: Shr-An Su, Taipei (TW); Bjergsen Y R Zhu, Taipei (TW); Ming-Pin Hsueh, Taipei (TW); John K C Lee, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 258 days.

(21) Appl. No.: 16/752,748

(22) Filed: Jan. 27, 2020

(65) Prior Publication Data
US 2021/0232614 A1 Jul. 29, 2021

(51) Int. Cl.
G06F 16/00 (2019.01)
G06F 7/00 (2006.01)
G06F 16/33 (2019.01)
G06F 16/332 (2019.01)

(52) U.S. Cl.
CPC ...... *G06F 16/3329* (2019.01); *G06F 16/3344* (2019.01)

(58) Field of Classification Search
CPC .......................... G06F 16/3329; G06F 16/3344
USPC ........................................................ 707/769
See application file for complete search history.

(56) References Cited

U.S. PATENT DOCUMENTS

| 9,386,152 B2 | 7/2016 | Riahi |
| 9,818,297 B2 | 11/2017 | El-Tantawy |
| 10,795,886 B1 * | 10/2020 | Samdani ............. G06F 16/3329 |
| 2007/0192319 A1 | 8/2007 | Finley |

(Continued)

OTHER PUBLICATIONS

Freedberg, Jr, "Artificial Stupidity: When Artificial Intelligence + Human + Disaster", Networks & Cyber, 7 pages, Jun. 2, 2017 [accessed on Sep. 12, 2019], retrieved from the Internet: <https://breakingdefense.com/2017/06/artificial-stupidity-when-artificial-intel-human-disaster/>.

(Continued)

*Primary Examiner* — Raquel Perez-Arroyo
(74) *Attorney, Agent, or Firm* — Steven M. Bouknight

(57) ABSTRACT

Embodiments of the present invention relate to a method, system, and computer program product for query system management. In a method, a question that is to be processed by a group of query systems is received. A group of answers to the question are received from the group of query systems, wherein the group of answers comprise an answer to the question from each of the query systems associated with the group of query systems. An association relationship is determined between the question and a query system from the group of query systems, wherein the association relationship is determined based on user feedback to the answer that is provided by the query system, and wherein the association relationship includes an association between the query and the query system and is used for selecting the query system for answering the question and further questions that are determined to be similar.

16 Claims, 10 Drawing Sheets

(56) References Cited

U.S. PATENT DOCUMENTS

| | | |
|---|---|---|
| 2015/0102945 A1 | 4/2015 | El-Tantawy |
| 2016/0205697 A1 | 7/2016 | Tan |
| 2017/0242860 A1* | 8/2017 | Souche ................. G06F 16/953 |
| 2018/0115645 A1* | 4/2018 | Iyer ................ G06Q 10/063112 |
| 2018/0293484 A1* | 10/2018 | Wang ....................... G06F 3/167 |
| 2019/0102064 A1* | 4/2019 | Brown .................... H04L 51/02 |
| 2020/0097616 A1* | 3/2020 | Asur ................. G06F 16/90332 |

OTHER PUBLICATIONS

Imtiaz, et al., "A Multiagent Reinforcement Learning Control Approach to Environment Exploration", SoutheastCon, Mar. 30-Apr. 2, 2017 [accessed on Sep. 12, 2019], 5 pages, IEEE, Charlotte, NC, USA, Retrieved from the Internet: <https://ieeexplore.ieee.org/document/7925381>.

Lopes Silva, et al., "A reinforcement learning-based multi-agent framework applied for solving routing and scheduling problems", Expert Systems With Applications: An International Journal, Available online Apr. 24, 2019, pp. 148-171, Elsevier Ltd., BR, Retrieved from the Internet: <https://www.sciencedirect.com/science/article/pii/S0957417419302866>.

Mell et al., "The NIST Definition of Cloud Computing", National Institute of Standards and Technology, Special Publication 800-145, Sep. 2011, 7 pages.

* cited by examiner

MANAGING QUERY SYSTEMS FOR RESPONDING TO QUERIES BASED ON ATTRIBUTES ASSOCIATED WITH A GIVEN QUERY

BACKGROUND

The present invention generally relates to query systems. Specifically, the present invention relates to a computer-implemented method, system and computer program product for managing query systems based on machine learning.

With developments of machine learning technology, query systems are provided for answering various types of questions from users. For example, a user may ask information about the weather, map, food, and the like. Currently, query systems provided by different developers may answer questions in almost every field, therefore how to manage these query systems becomes a focus.

SUMMARY

According to one embodiment of the present invention, there is provided a computer-implemented method. In the method, a question that is to be processed by a group of query systems is received. A group of answers to the question are received from the group of query systems, wherein the group of answers comprise an answer to the question from each of the query systems associated with the group of query systems. An association relationship is determined between the question and a query system from the group of query systems, wherein the association relationship is determined based on user feedback to the answer that is provided by the query system, and wherein the association relationship includes an association between the query and the query system and is used for selecting the query system for answering the question and one or more further questions that are determined to be similar the question. With these embodiments, the user's feedback to answers from multiple query systems may be used as a ground for selecting a query system from the group of query systems. Therefore, the user's requirement may be satisfied in a more effective and accurate way.

According to another embodiment of the present invention, there is provided a computer-implemented system. The computer-implemented system comprises one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing the above method.

According to another embodiment of the present invention, there is provided a computer program product. The computer program product comprises one or more computer-readable storage devices and program instructions stored on at least one of the one or more computer-readable storage devices, the program instructions executable by a processor, the program instructions comprising instructions to perform the above method.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
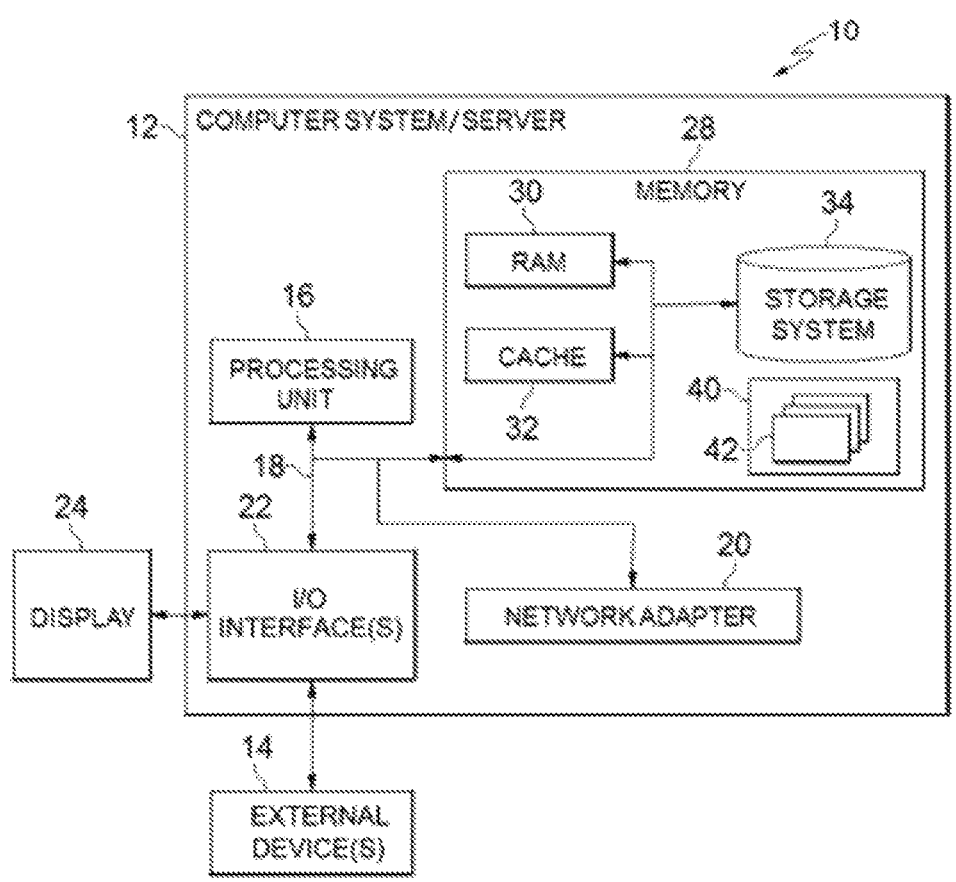
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access, capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration setting.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configuration.

Infrastructure as a Service (IaaS) the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows;

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations) It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds.

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabov.

In cloud computing node 10 there is a computer system/server 12 or a portable electronic device such as a communication device, which is operational with numerous other general purpose or special purpose computing system environments or configurations Examples of well-known computing systems, environments, and/or configurations that may be appropriate for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the lik.

Computer system/server 12 may be described in the general context of computer system-executable instructions, such as program modules, being executed by a computer system, Generally, program modules may include routines, programs, objects, components, logic, data structures, and so on that perform particular tasks or implement particular abstract data types Computer system/server 12 may be practiced in distributed cloud computing environments where tasks are performed by remote processing devices that are linked through a communications network. In a distributed cloud computing environment, program modules may be located in both local and remote computer system storage media including memory storage device.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the inventio.

Program/utility 40, having a set (at least one) of program modules 42, may be stored in memory 28 by way of example, and not limitation, as well as an operating system, one or more application programs, other program modules, and program data Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12, and/or any devices (e.g., network card, modem, etc.) that enable computer system/server 12 to communicate with one or more other computing devices Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
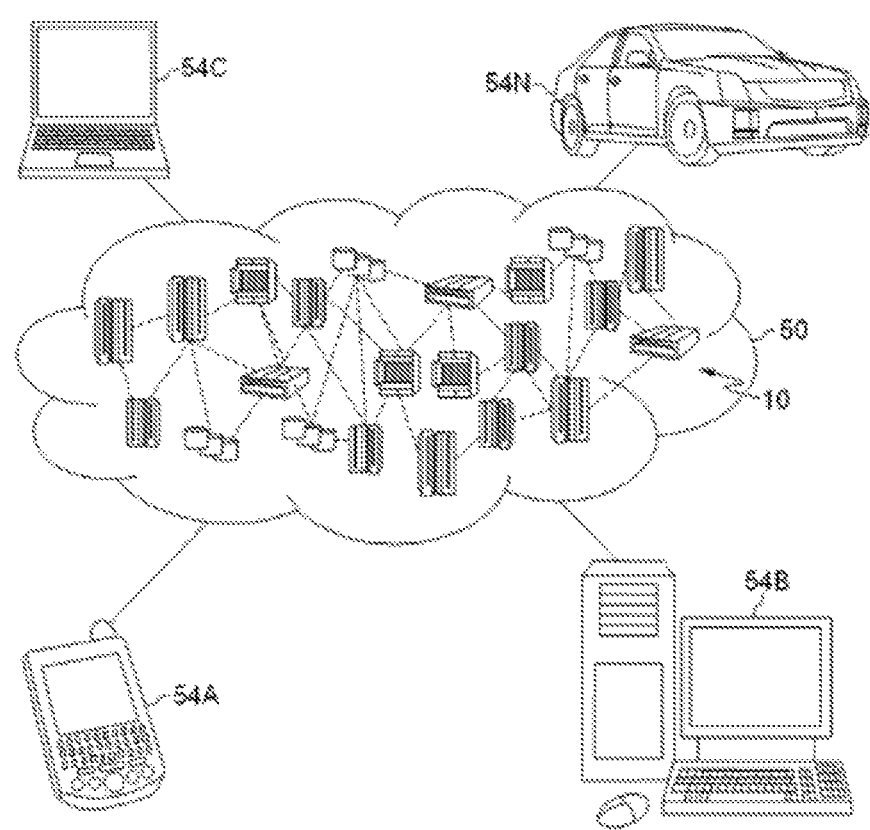
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
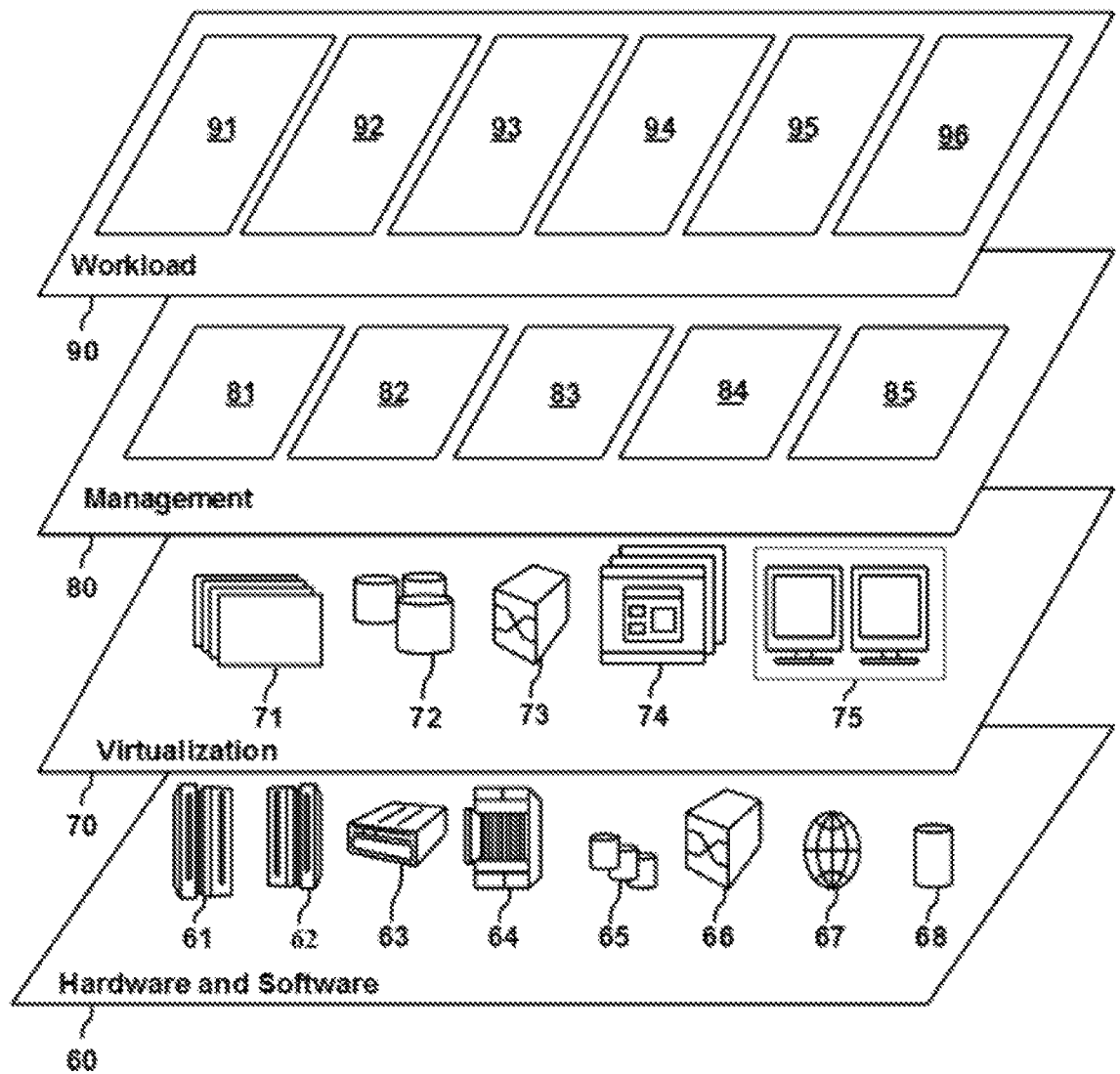
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61, RISC (Reduced Instruction Set Computer) architecture-based servers 62, servers 63, blade servers 64; storage devices 65, and networks and networking components 66. In some embodiments, software components include network application server software 67 and database software 68.

Virtualization layer 70 provides an abstraction layer from which the following examples of virtual entities may be provided: virtual servers 71, virtual storage 72, virtual networks 73, including virtual private networks, virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include, mapping and navigation 91; software development and lifecycle management 92, virtual classroom education delivery 93; data analytics processing 94, transaction processing 95; and query system management 96.

It should be noted that the processing of query system management 96 according to embodiments of this invention could be implemented by computer system/server 12 of FIG. 1 Hereinafter, reference will be made to FIG. 4 to FIG. 10 to describe details of the query system management 96.

Figure 4:
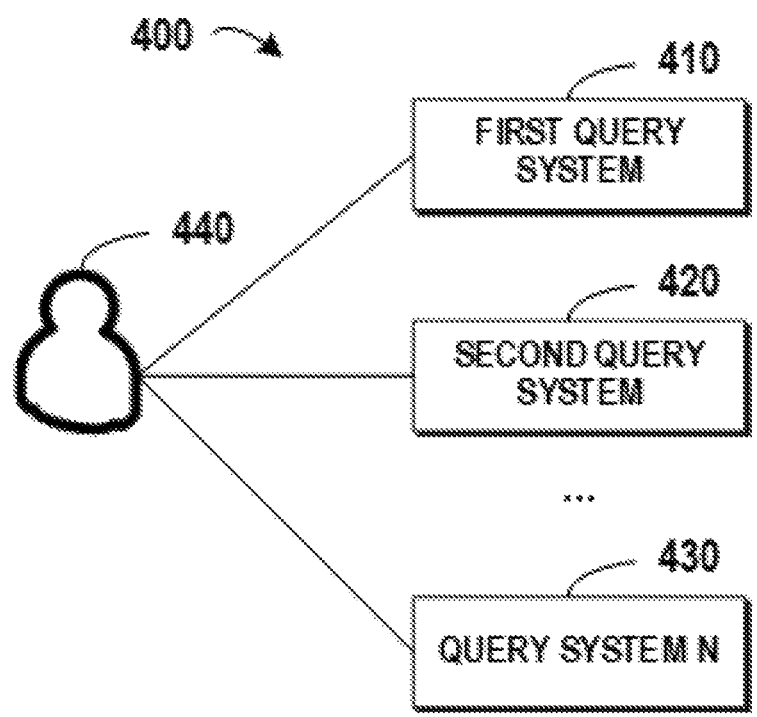
FIG. 4 depicts an example diagram of an environment in which an embodiment of the present invention may be implemented.

Nowadays, various types of query systems may be designed for answering questions from users. For example, a voice assistant application installed in a mobile device may help a user to find a path to reach a destination, obtain restaurant or weather information, and the like Multiple query systems may be installed in the mobile device, and hereinafter reference will be made to FIG. 4 for more details. FIG. 4 depicts an example diagram of an environment 400 in which an embodiment of the present invention may be implemented. There may be a group of query systems, for example, a first query system 410, a second query system 420, . . . , and query system N 430.

In one solution, a user 440 may submit a question to each of the group of query systems so as to obtain a desired answer. The group of query systems may comprise different knowledge databases in which the question may be searched. Depending on contents of the databases, answers from different query systems may be different. For example, if the user 440 wants to know a recommended restaurant, the first query system 410 may return a restaurant A1, and the second query system 420 may return a different restaurant A2. In this solution, the user 440 has to submit his/her question to multiple query systems and receives multiple answers, which will cause the user to perform complex operations.

In view of the above, embodiments of the present invention provide an effective solution for managing query systems. In embodiments of the present invention, a query system management 96 may be provided for managing a group of query systems. The query system management 96 may act as an interface between the user 440 and the group of query systems 410, 420, . . . , and 430. The user 440 may submit his/her question to the query system management 96, and then the query system management 96 may obtain answers from the group of query systems and send them back to the user 440. Specifically, an association relationship may be provided for selecting a query system for answering the question. Hereinafter, reference will be made to FIG. 5 to provide a general description of embodiments of the present invention.

Figure 5:
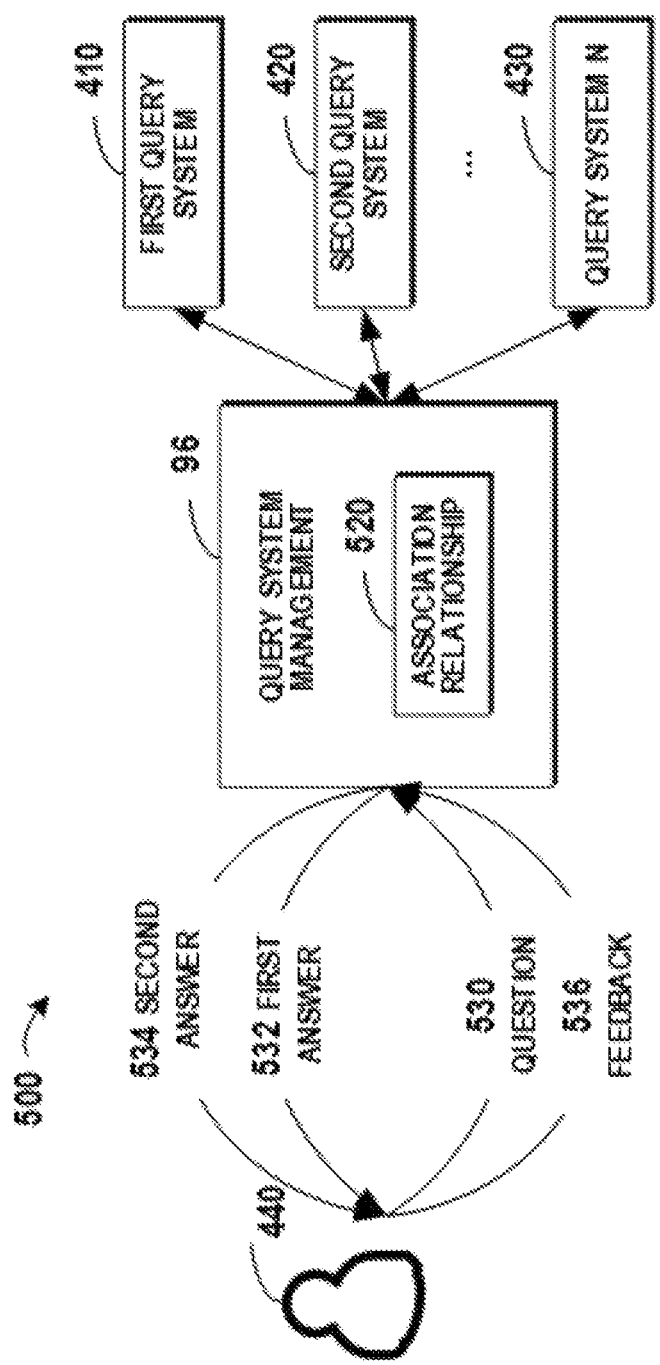
FIG. 5 depicts an example diagram for managing query systems according to an embodiment of the present invention.

FIG. 5 depicts an example diagram 500 for managing the query systems according to an embodiment of the present invention. In FIG. 5, the query system management 96 may be connected to the first query system 410, the second query system 420, . . . , and the query system N 430, here an association relationship 520 is provided for managing the query systems. Although FIG. 5 depicts that the association relationship 520 is comprised in the query system management 96, in another embodiment of the present invention, the association relationship 520 may be provided in another position and connected to the query system management 96. Further, although FIG. 5 illustrates more than three query systems, the group of query systems may include less query systems, for example, the group may include only the first query system 410 and the second query system 420. Here, the association relationship 520 may represent an association between a question and a query system from the group of query systems. For example, the association may indicate a preference in selecting a query system from the first query system 410 and the second query system 420 for answering a question.

The user 440 may submit a question 530 to the query system management 96, and then the query system management 96 may direct the question 530 to the group of query systems. Further, the query system management 96 may obtain answers from the group of query systems. For example, a first answer 532 obtained from the first query system 410 and a second answer 534 obtained from the second query system 420 may be provided to the user 440. The user 440 may provide a feedback 536 to the first answer 532 and the second answer 534. At this point, the association relationship 520 may be determined based on the feedback 536.

In embodiments of the present invention, the association relationship 520 may be implemented based on machine learning technique. During operations of the query system management 96, the association relationship 520 may be trained based on questions and feedbacks to answers from the group of query systems. For example, if the user 440 always gives positive feedbacks (for example, the user 440 agrees with the restaurant provided by the first query system 410) to answers from the first query system 410, then the association relationship 520 may be determined towards a trend that further similar questions should also be directed to the first query system 410. If the user 440 always gives negative feedbacks (for example, the user 440 says "I don't like the restaurant.") to answers from the second query system 420, then the association relationship 520 may be determined towards a trend that further similar questions should not be directed to the second query system 420.

With these embodiments, history feedbacks from the user 440 may be used in updating the association relationship 520. As the feedbacks from the user 440 are provided after the user's careful consideration, the determined association relationship 520 may reflect the user's preference and experience. Therefore, the association relationship 520 may be used in selecting a further query system for answering a further question. It is to be understood that the term "feedback" may be interpreted in a broad way. For example, the feedback may be comments of the user 440 to the answers. In another example, the feedback may be obtained from another application such as a navigation program for finding ways to go to the restaurant. In still another example, the feedback may be payment information showing that the user has paid in the restaurant.

Figure 6:
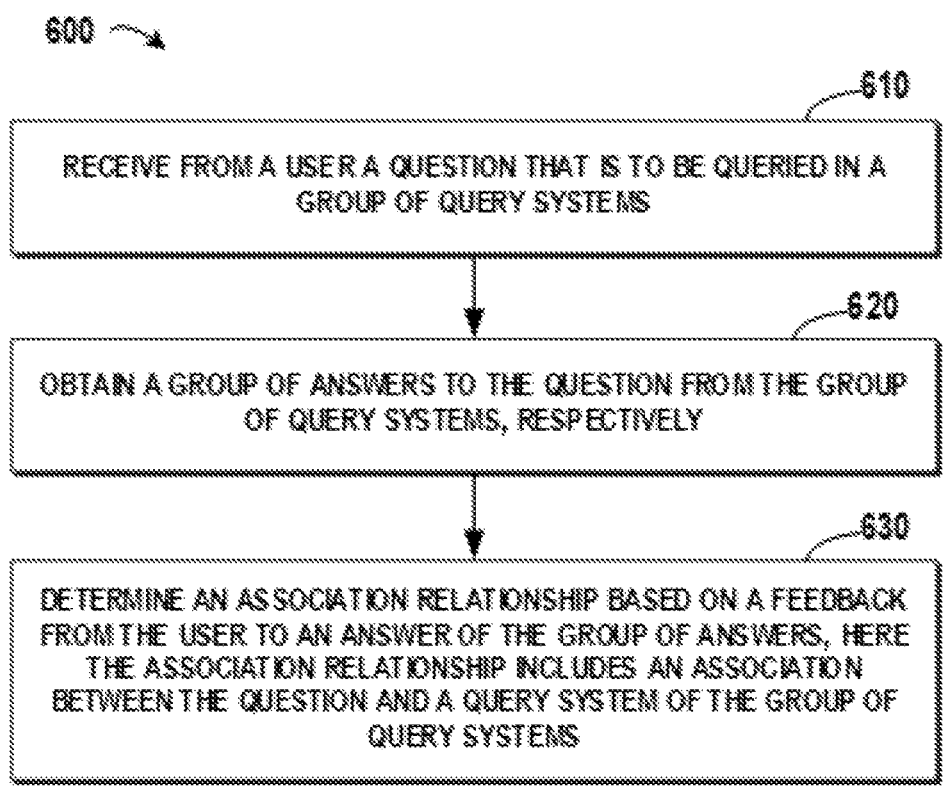
FIG. 6 depicts an example flowchart of a method for managing query systems according to an embodiment of the present invention.

The query system management 96 may be implemented by a method and reference will be made to FIG. 6 for details of the method. FIG. 6 depicts an example flowchart of a method 600 for managing query systems according to an embodiment of the present invention. At a block 610, the question 530 may be received from the user 440, here the question 530 is to be queried in the group of query systems comprising at least the first query system 410 and the second query system 420. Compared with the solution where the user 440 to submit the question 530 to the group of query system one by one, in the embodiments, the user 440 may submit the question 530 only once, and then the question 530 may be directed to multiple query systems for retrieving respective answers.

At a block 620, a group of answers may be obtained from the group of query systems, respectively. For example, the first answer 532 to the question 530 may be obtained from the first query system 410 and the second answer 534 to the question 530 may be obtained from the second query system 420, respectively. At a block 630, the association relationship 520 may be determined based on the feedback 536 from the user 440 to an answer of the first answer 532 and the second answer 534. The association relationship 520 here may include a preference in selecting a query system from the first query system 410 and the second query system 420 for answering the question Initially, the association relationship 520 may be set to default scores such as 0 or other relative low values, and then the association relationship 520 may be updated based on the user's feedbacks.

According to one embodiment of the present invention, the association relationship 520 may comprise an association between an attribute of a question and a query system of the first query system 410 and the second query system 420. Here, the attribute may comprise one or more of a field of the question, a location associated with the question, time associated with the question and the like. Further, the attribute may comprise profile information of the user 440. The field indicates a domain to which the question belongs. For example, for a question of "Can you tell me a nice restaurant in Beijing?" the field and the location may be determined as "Food" and "Beijing," respectively. In another example, for a question of "The weather tomorrow in New York?" the field, the location and the time may be determined as "Weather." "New York," and "tomorrow," respectively.

For the purpose of description, the field will be taken as an example of the attribute of the question for providing more details of the embodiments of the present invention. According to one embodiment of the present invention, the field of the question 530 may be obtained based on a semantic analysis of the question 530. The question 530 may be inputted by the user 440 via text input, voice input or another input method. The text may be extracted from the question 530 for the semantic analysis. For example, one example question may be "Can you tell me a nice restaurant nearby?" Through the sematic analysis, a key word such as "restaurant" may be extracted and then "food" may be identified as the field. Further, for questions such as "What's the weather for tomorrow?" and "I want to go to the summer palace." Key words of "weather" and "the summer palace" may be extracted and then the field of the question may be determined as "weather" and "map," respectively. It is to be understood that this paragraph only provides example fields for the question, in other embodiments, the fields may be classified in a different manner.

According to embodiments of the present invention, the association between the field of the question and the query system may be represented in various manners. For example, a score may be set for indicating the association. Table 1 illustrates an example data structure that may be used for representing the association relationship 520.

TABLE 1

| No. | Field | System ID | Score |
| --- | --- | --- | --- |
| 1 | Map | First Query System | 90 |
| 2 | Food | First Query System | 10 |
| 3 | Food | Second Query System | 80 |
| ... | ... | ... | ... |
|  | Weather | Query System N | 85 |

In Table 1, the first column indicates a serial number of the association, the second column indicates a field of the question, the third column indicates an identification of the query system, and the fourth column indicates a score between the field indicated in the second column and the query system indicated in the third column. Taking the first entry in Table 1 as an example, the score between the association of "Map" and "First Query System" is 90, which represents that the user like answers provided by the first query system 410 when the question relates to the map. For the second entry, the score between the association of "Food" and "First Query System" is 10, which represents that the user dislike answers provided by the first query system 410 when the question relates to the food Initially, a value of the score in each entry may be set for example to 0 or another small value. After several iterations of updating, values of the score may change. It is to be understood that the above Table 1 is only an example including nonzero scores, in another example, zero scores may be included in Table 1.

According to one embodiment of the present invention, the association relationship 520 may include more information other than the field of the question. For example, the location of the user 440 may be included for providing more detailed information about the user 440. At this point, the association relationship 520 may be represented by the following Table 2, such that requirements from the user 440 may be described with more detailed information According to one embodiment of the present invention, the association relationship 520 may further include but not limited to the location associated with the question, and the like In another example, the attribute may also comprise a location of the user.

TABLE 2

| No. | Field | Location | System ID | Score |
| --- | --- | --- | --- | --- |
| 1 | Map | China | First Query System | 90 |
| 2 | Food | U.S. | First Query System | 10 |
| 3 | Food | China | Second Query System | 80 |
| ... | ... | ... | ... | ... |
|  | Weather | China | Query System N | 85 |

According to one embodiment of the present invention, a satisfaction level of the user 440 may be determined from the feedback, here the satisfaction level may reflect a degree to which the user 440 is satisfied with the answer, Various data structures may be used for representing the satisfaction level. For example, integers between −3 and +3 may be used A positive integer represents that the user is satisfied with the answer, while a negative integer represents that the user is not satisfied with the answer. The greater the integer is, the more satisfied the user is. In other embodiments of the present invention, the satisfaction level may be represented with another format.

Figure 7:
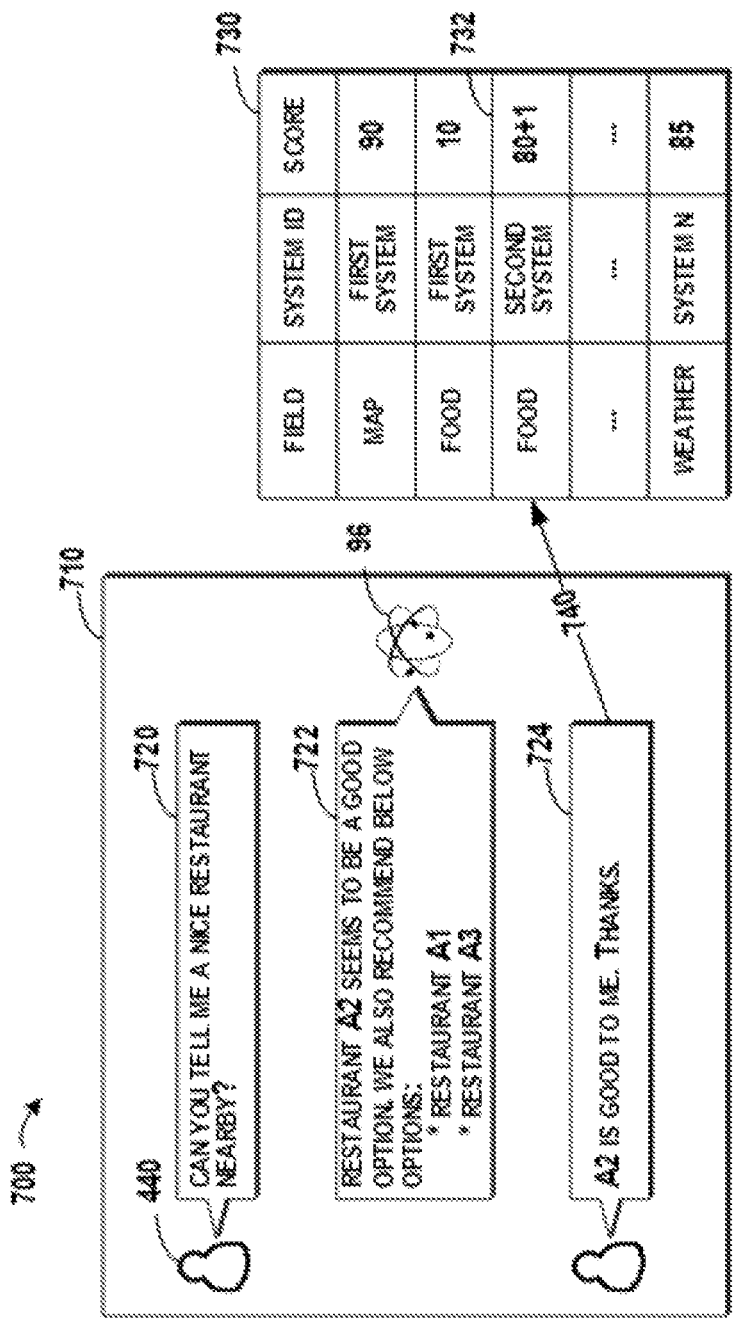
FIG. 7 depicts an example diagram of updating an association relationship between a field of a question and a query system according to an embodiment of the present invention.

Further, the association in the association relationship may be updated based on the determined satisfaction level, the association is between the attribute of the question and a query system from which the answer is provided. Reference will be made to FIG. 7 for more details where the field is taken as an example of the attribute. FIG. 7 depicts an example diagram 700 of updating an association relationship between a field of a question and a query system according to an embodiment of the present invention. In FIG. 7, an interface 710 illustrates an interaction between the user 440 and the query system management 96. The user 440 may ask a question 720 "can you tell me a nice restaurant nearby?" The query system management 96 may direct the question 720 to the first query system 410, the second query system 420, . . . , and the query system N 430. Then, a message 722 including three restaurants A1, A2 and A3 may be provided to the user 440. Here, the restaurant A1 is returned from the first query system 410, the restaurant A2 is returned from the second query system 420, and the restaurant A3 is returned from the query system N 430.

The user 440 may provide a feedback 724 and says "A2 is good to me Thanks." At this point, the feedback 724 may be analyzed based on semantic meaning of the feedback to determine the satisfaction level. For example, as the word "good" shows that the user 440 agrees with the restaurant A2, therefore the satisfaction level may be determined as for example "1." According to one embodiment of the present invention, the association may be increased if the satisfaction level is positive. In FIG. 7, a reference number 730 represents an example association relationship including multiple association entries between fields and systems. For the sake of simplicity, the term "query system" is abbreviated as system in the drawings, and thus the first query system 410 is abbreviated as first system in FIG. 7.

As the question 720 belongs to the field of "food" and the restaurant A2 is recommended by the second query system 420, the association may be found as shown by an arrow 740. Then, the score 732 may be updated based on the satisfaction level "1." Various methods may be used for determining an updating step, in one embodiment of the present invention, the updating step may be set based on the satisfaction level, and thus the score will be updated to 80+1=81.

Figure 8:
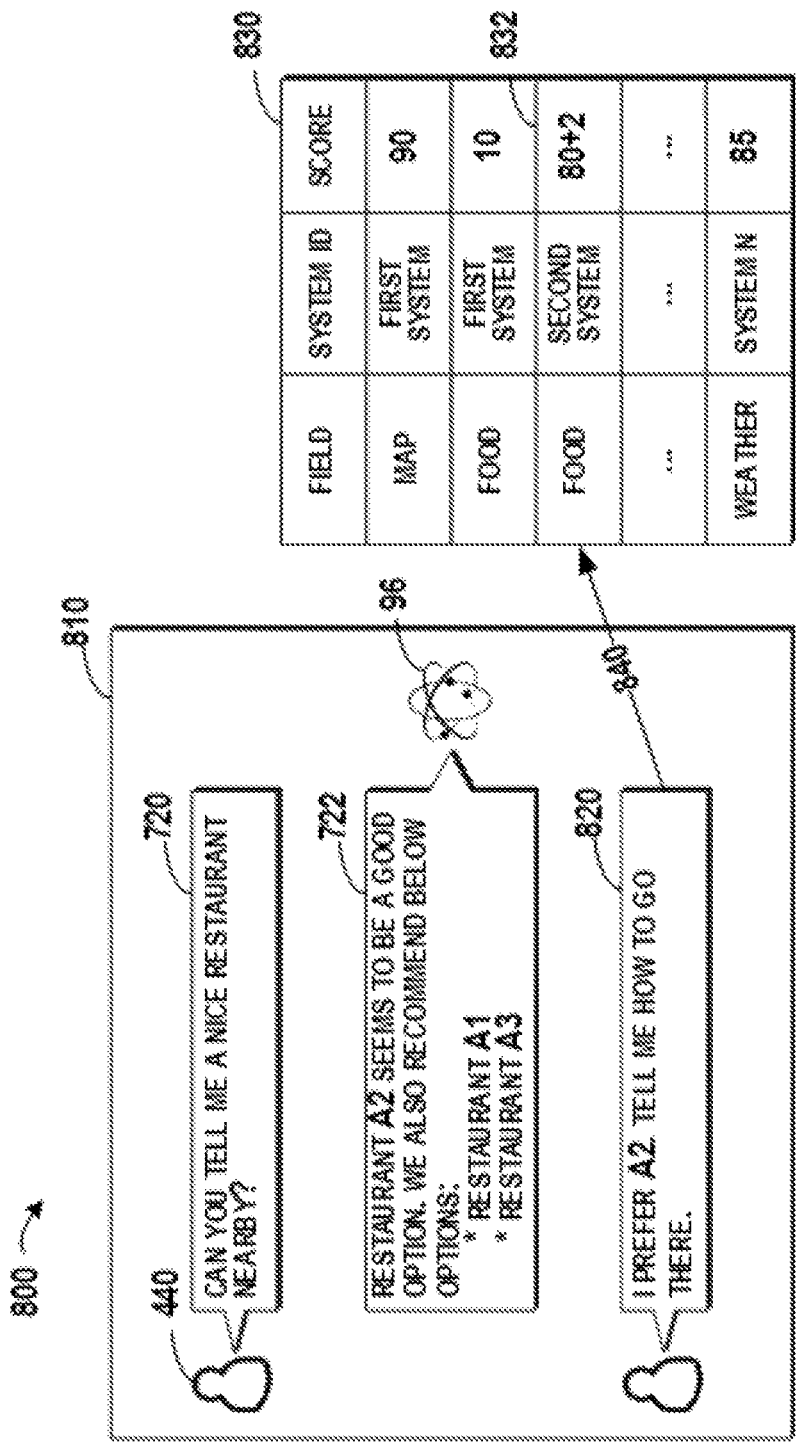
FIG. 8 depicts an example diagram of updating an association relationship between a field of a question and a query system according to an embodiment of the present invention.

FIG. 8 depicts an example diagram 800 of updating an association relationship between a field of a question and a query system according to an embodiment of the present invention. In FIG. 8, an interface 810 between the user 440 and the query system management 96 which is similar to the interface 710 in FIG. 7. In FIG. 8, the user 440 provides another feedback 820 to the message 722. The feedback 820 recites "I prefer A2. Tell me how to go there" It may be determined that the sentence "Tell me how to go there" shows that the user 440 really agrees with the restaurant A2 and wants to go Therefore, the satisfaction level may be set to a greater value such as "2." As the question 720 belongs to the field of "food" and the restaurant A2 is recommended by the second query system 420, the association may be found as shown by an arrow 840. The score 832 may be updated based on the satisfaction level "2," and thus the score will be updated to 80+2=82.

Figure 9:
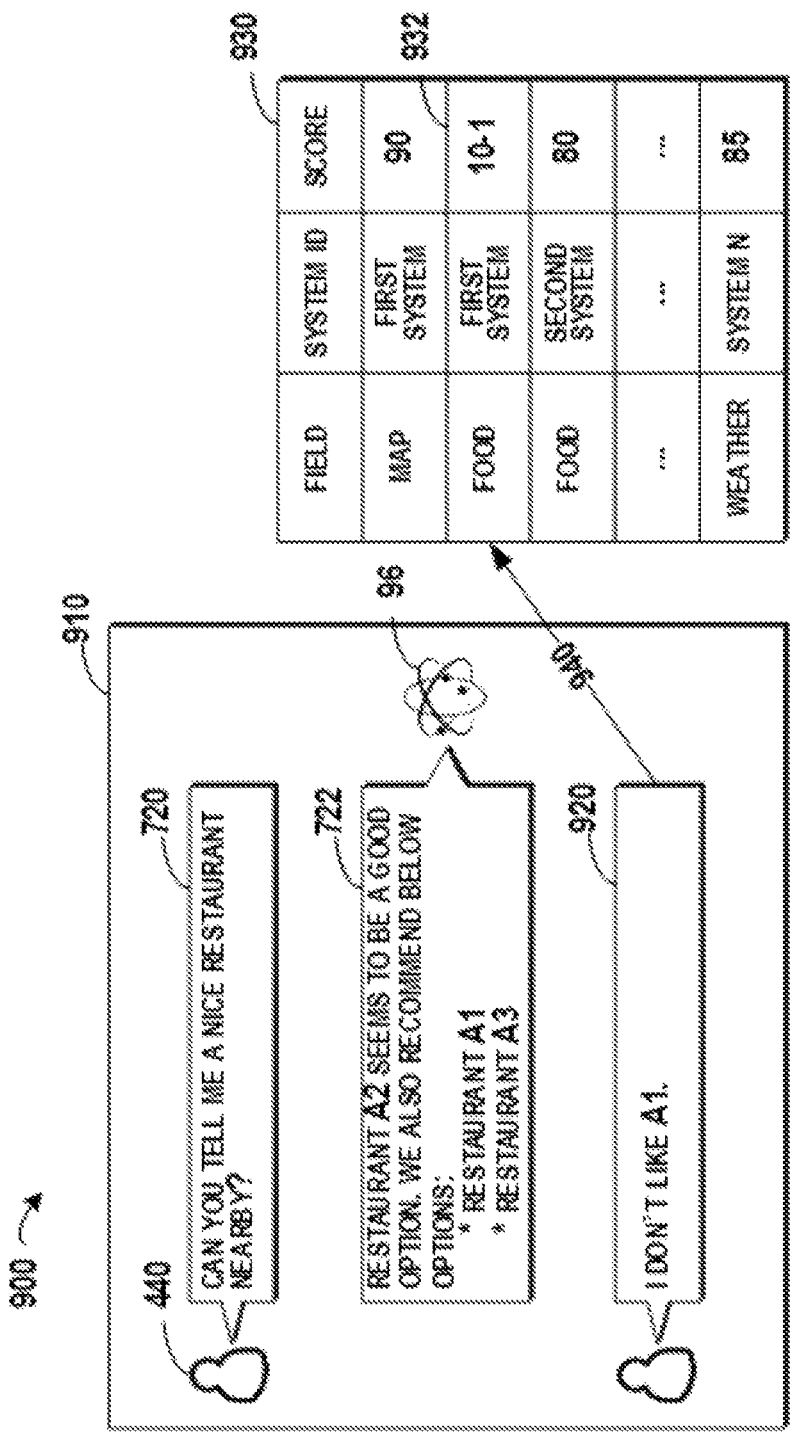
FIG. 9 depicts an example diagram of updating an association relationship between a field of a question and a query system according to an embodiment of the present invention.

According to one embodiment of the present invention, the association may be decreased if the satisfaction level is negative, and reference will be made to FIG. 9 for further details. FIG. 9 depicts an example diagram 900 of updating an association relationship between a field of a question and a query system according to an embodiment of the present invention. In FIG. 9, an interface 910 between the user 440 and the query system management 96 which is similar to the interface 710 in FIG. 7. In FIG. 9, the user 440 provides another feedback 920 to the message 722. The feedback 920 recites "I don't like A1." It may be determined that the user 440 is not satisfied with the answer provided from the first query system 410, and thus the satisfaction level may be set to a negative value such as "−1." As shown by an arrow 940, the association may be found and the score 932 may be updated to 10−1=9.

With the above embodiments, the association relationship may be updated in an easy and convenient manner. Further, as the association relationship is trained based on the degree of the user's satisfaction to the answers according to historical information, the trained association relationship may accurately reflect the association between an attribute and a query system. Further, the query system having a higher association with an attribute of the question may be selected for providing an answer.

According to one embodiment of the present invention, the method 600 may be implemented iteratively, such that the association relationship 520 may be fully trained to reflect users' historical experiences. For example, a further question that is to be queried in the group of query systems may be received from the user 440 or from another user. If it is desired to obtain the user's own preference, then the association relationship 520 may be trained by historical experiences from the user 440, so as to obtain a fully customized association relationship 520. In another example, historical experiences from multiple users may be used for the training.

Then, how to direct a future, or further, question may be determined based on the updated association relationship. According to one embodiment of the present invention, a threshold may be determined for indicating whether the association relationship 520 includes well trained association(s). Depending on the range of the score, the threshold may be set to a higher value for judging whether an association is well trained. If the range of the score is [0, 100], then the threshold may be set to 90 or another greater value. When a further question is received, an attribute of the further question may be determined first, and then association relationship 520 may be searched for scores related to the field. If all the scores related to the field is below the threshold, it indicates that none of the associations is well trained. If a score related to the field is above the threshold, it indicates that an association related to the score is well trained.

Referring back to FIG. 7, if the further question relates to the field of "Food" and all the scores related to "Food" are below the threshold of "90," then the further question may be directed to multiple query systems. At this point, the further question may be directed to all of or a portion of the group of query systems. In one example, the further question may be directed to the first query system 410 and the second query system 420. In another example, the further question may be directed to the first query system 410, the second query system 420, . . . , and the query system N 430. In still another example, the further question may be directed to query systems having scores close to threshold.

In the above example where the further question is directed to the first query system 410 and the second query system 420, the answers from the first query system 410 and the second query system 420 may be sent to the user. Further, the user may provide a feedback to the answers, based on which the association relationship 520 will be updated With these embodiments of the present invention, the association relationship 520 may be updated towards a trend that further questions will be directed to a query system that previous user(s) gives a positive feedback.

In another situation, if the further question relates to the field of "Map" and a score related to "Map" is above the threshold of "90," then the further question may be directed to a query system with the score. It is to be understood, the term "above" may be explained in a broader way, and it may include the situation of being greater than or equaling to. According to one embodiment of the present invention, a target query system may be selected from the group of query systems based on scores. If an association between the field of the further question and a query system is above the predetermined threshold, then the query system may be selected as the target query system. Referring to FIG. 7 again, in the association between "Map" and the first query system, the score is 90 which equals to the threshold, and thus the further question will be directed to only the first query system 410. Next, an answer may be obtained from the first query system 410 and provided to the user for consideration.

Figure 10:
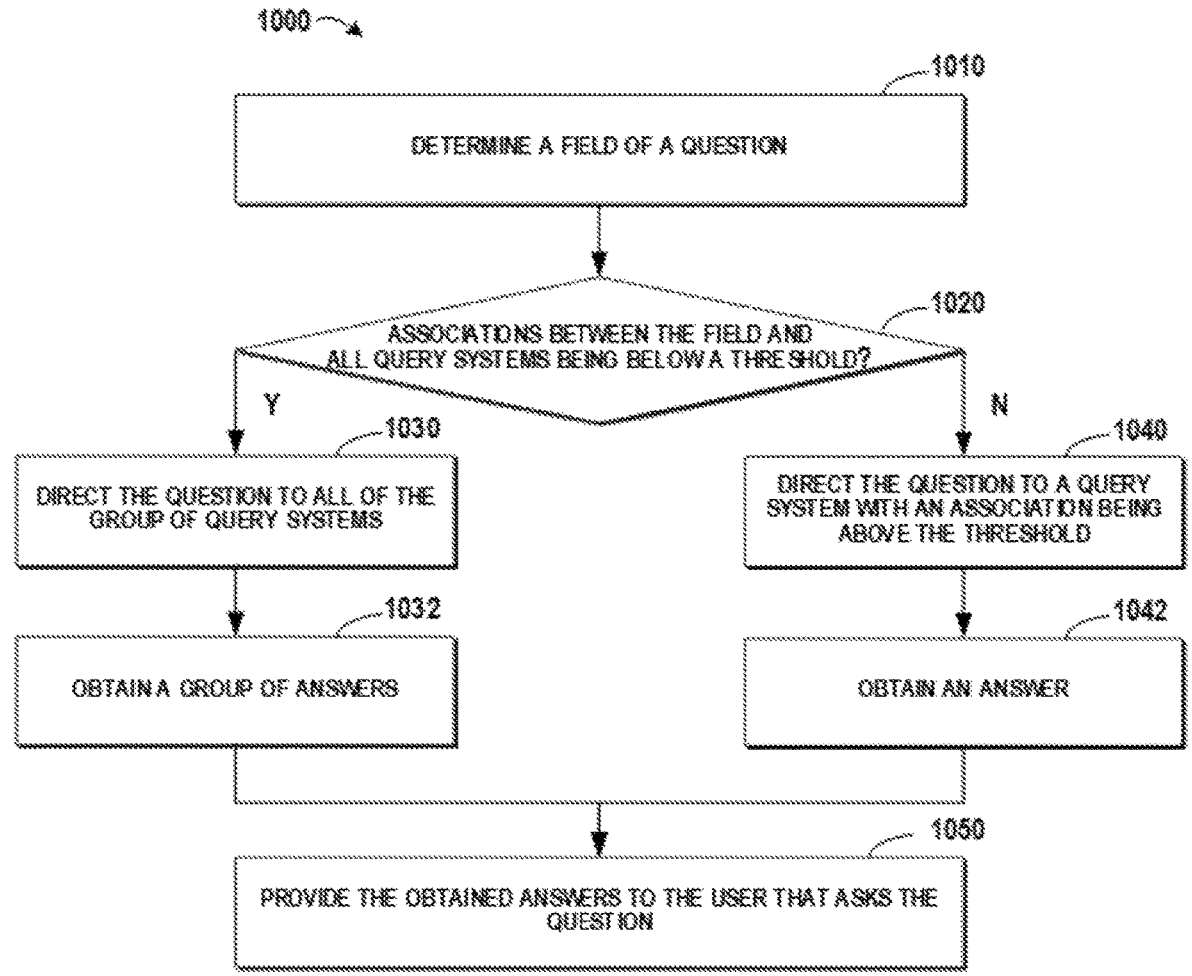
FIG. 10 depicts an example flowchart of a method for directing a question to a query system according to an embodiment of the present invention.

Hereinafter, reference will be made to FIG. 10 for details for directing a question FIG. 10 depicts an example flowchart of a method 1000 for directing a question to a query system according to an embodiment of the present invention. At a block 1010, once a question is received, a field of the question may be determined. At a block 1020, associations related to the determined field may be selected from the association relationship 520, if scores of all the selected associations are below the threshold, then the method 1000 proceeds to a block 1030, and the question may be directed to all query systems such as the first query system 410 and the second query system 420. Next, a group of answers may be obtained from the multiple query systems at a block 1032. At the block 1020, if a score of an association related to the determined field is above the threshold, then the method 1000 proceeds to a block 1040, where the question is directed to only one query system with a higher association. At a block 1042, an answer may be obtained from the query system and then sent back to the user.

Usually, scores in the association relationship 520 may reach the threshold at different time points, sometimes they reach the threshold at the same time In a situation where the first query system 410 and the second query system 420 reach the threshold at the same time for a question related to "Food," one query system may be selected randomly for answering the question. Alternatively, the question may be directed to both of the two query systems until the score of one query system is updated to a score higher than that of the other.

In embodiments of the present invention, Reinforcement Learning (RL) may be adopted to learn the preference of the user. Further, for the sake of simplicity, details of the Reinforcement Learning will be omitted, and the following paragraphs will present a general principle for the training Specifically, the training procedure may be based on a formula as below $$Q'[s,\alpha]=(1-\alpha)\cdot Q[s,\alpha]+\alpha(r+\lambda\cdot G[s,\alpha]) \quad \text{Formula 1}$$

In the above formula, Q' donates a dataset that is obtained in an iteration during the training, where Q' is associated with s and $\alpha$. Here, s donates a field of the question, such as the fields of Food, Map, Weather, and the like. It is to be understood that the above fields are just examples, and the field may include more or less categories in another embodiment. Further, $\alpha$ donates an identification of the query system, such as the first query system 410, the second query system 420, ..., and the query system N 430. Q donates a dataset that is obtained in a previous iteration during the training, where Q is also associated with s and $\alpha$.

In Formula 1, $\alpha$ donates the learning rate for representing how quickly the dataset Q will be updated, r donates a reward such as the increasing operation and the decreasing operation described with reference to FIGS. 7 to 9 in the training. G donates a dataset obtained from the history experiences of other users, and $\lambda$ is a parameter for adjusting the importance of the impact of G. For example, if $\lambda$ is set to 0, then historical experiences from other users will not be considered, and the association relationship 520 will be trained based on historical experiences of the user 440. It is to be understood that the above Formula 1 is just an example formula that may be used in the training In other embodiments of the present invention, other formula may be used in training the association relationship 520.

Although the above paragraphs provide detailed implementation by taking the field as an example of the attribute, the attribute may comprise, but not limited to, a field of the question, a location associated with the question, time associated with the question, a profile of the user, and the like. For example, the attribute may comprise both the field and the location, and thus the attribute may be represented by a two-tuples of (field, location).

The present invention may be a system, a method, and/or a computer program product at any possible technical detail level of integration. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any appropriate combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any appropriate combination of the foregoing A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, a question that is to be processed by a group of query systems;
   obtaining, by one or more processors, a group of answers to the question from the group of query systems, wherein the group of answers comprise an answer to the question from each of the query systems associated with the group of query systems; and
   determining, by one or more processors, an association relationship between the question and a query system from the group of query systems, wherein the association relationship is determined using machine learning and based on an association between an attribute of the question and the query system of the group of query systems, wherein the attribute is selected from at least a field of the question, a location associated with the question, a time, and different combinations of attributes thereof associated with the question, and wherein the attribute is used for selecting the query system for answering the question and one or more further questions that are determined to be similar to the question; and
   automatically determining a score for the association relationship corresponding to the query system based on one attribute and based on each of the different combinations of attributes, and automatically increasing or decreasing the score for the association relationship based on detected feedback;
   receiving the one or more further questions;
   determining, for each of the one or more further questions, which attributes are included in a further question from the one or more further questions, and automatically directing the further question to at least one query system from the group of query systems based on which of the attributes are included in the further question and based on determined scores for determined association relationships between the attributes and each query system from the group of query systems, wherein the automatically directing further comprises:
   determining that the further question includes only a first attribute and that the score for the at least one query system is above a first threshold for the first attribute, and directing the further question to the at least one query system having the score above the first threshold for the first attribute;
   determining that the further question includes the one or more of the different combinations of attributes, wherein the one or more of the different combinations of attributes comprises the first attribute, and that the score for the at least one query system is above a second threshold corresponding to the one or more different combinations of attributes, and directing the further question to the at least one query system having the score above the second threshold corresponding to the one or more different combinations of attributes; and
   determining that the determined scores for each query system from the group of query systems is below the first threshold and the second threshold, and directing the one or more further questions to all query systems in the group of query systems in response to determining that the determined scores for each query system from the group of query systems is below the first threshold and the second threshold.

2. The computer-implemented method of claim 1, wherein the determining the association relationship, further comprises:
   determining, by one or more processors, a satisfaction level of a user to the answer from the detected feedback; and
   determining, by one or more processors, the association relationship between the attribute of the question and the query system from which the answer is provided based on the determined satisfaction level.

3. The computer-implemented method of claim 2, wherein the determining the association relationship based on the determined satisfaction level further comprises:
   increasing, by one or more processors, the association relationship based on the satisfaction level being positive.

4. The computer-implemented method of claim 2, wherein
   determining the association relationship based on the determined satisfaction level further comprises:
   decreasing, by one or more processors, the association relationship based on the satisfaction level being negative.

5. The computer-implemented method of claim 2, further comprising:
   obtaining, by one or more processors, the attribute of the question based on a semantic analysis to the question.

6. The computer-implemented method of claim 2, further comprising:
   receiving, by one or more processors, the further question that is to be processed by the group of query systems;
   directing, by one or more processors, the further question to the group of query systems based on the determined association relationship; and
   sending, by one or more processors, answers from the group of query systems to the user from which the question is received.

7. The computer-implemented method of claim 2, further comprising:
   receiving, by one or more processors, the further question that is to be processed by the group of query systems;
   selecting, by one or more processors, a target query system from the group of query systems based on the determined association relationship; and
   providing, by one or more processors, a further answer to the further question from the selected target query system to the user from which the further question is received.

8. A computer system, comprising:
   one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:
   receiving, by the one or more processors, a question that is to be processed by a group of query systems;
   obtaining, by the one or more processors, a group of answers to the question from the group of query systems, wherein the group of answers comprise an answer to the question from each of the query systems associated with the group of query systems; and
   determining, by the one or more processors, an association relationship between the question and a query system from the group of query systems, wherein the association relationship is determined using machine learning and based on an association between an attribute of the question and the query system of the group of query systems, wherein the attribute is selected from at least a field of the question, a location associated with the question, a time, and different combinations of attributes thereof associated with the question, and wherein the attribute is used for selecting the query system for answering the question and one or more further questions that are determined to be similar to the question; and
   automatically determining a score for the association relationship corresponding to the query system based on one attribute and based on each of the different combinations of attributes, and automatically increasing or decreasing the score for the association relationship based on detected feedback;
   receiving the one or more further questions;
   determining, for each of the one or more further questions, which attributes are included in a further question from the one or more further questions, and automatically directing the further question to at least one query system from the group of query systems based on which of the attributes are included in the further question and based on determined scores for determined association relationships between the attributes and each query system from the group of query systems, wherein the automatically directing further comprises;
   determining that the further question includes only a first attribute and that the score for the at least one query system is above a first threshold for the first attribute, and directing the further question to the at least one query system having the score above the first threshold for the first attribute;
   determining that the further question includes the one or more of the different combinations of attributes, wherein the one or more of the different combinations of attributes comprises the first attribute, and that the score for the at least one query system is above a second threshold corresponding to the one or more different combinations of attributes, and directing the further question to the at least one query system having the score above the second threshold corresponding to the one or more different combinations of attributes; and
   determining that the determined scores for each query system from the group of query systems is below the first threshold and the second threshold, and directing the one or more further questions to all query systems in the group of query systems in response to determining that the determined scores for each query system from the group of query systems is below the first threshold and the second threshold.

9. The computer system of claim 8, wherein the determining the association relationship, further comprises:
   determining a satisfaction level of a user to the answer from the detected feedback; and
   determining the association relationship between the attribute of the question and the query system from which the answer is provided based on the determined satisfaction level.

10. The computer system of claim 9, wherein the determining the association relationship based on the determined satisfaction level further comprises:
increasing the association relationship based on the satisfaction level being positive.

11. The computer system of claim 9, wherein determining the association relationship based on the determined satisfaction level further comprises:
decreasing the association relationship based on the satisfaction level being negative.

12. The computer system of claim 9, further comprising:
obtaining the attribute of the question based on a semantic analysis to the question.

13. The computer system of claim 9, further comprising:
receiving the further question that is to be processed by the group of query systems;
directing the further question to the group of query systems based on the determined association relationship; and
sending answers from the group of query systems to the user from which the question is received.

14. The computer system of claim 9, further comprising:
receiving the further question that is to be processed by the group of query systems;
selecting a target query system from the group of query systems based on the determined association relationship; and
providing a further answer to the further question from the selected target query system to the user from which the further question is received.

15. A computer program product, comprising:
one or more computer-readable storage devices and program instructions stored on at least one of the one or more computer-readable storage devices, the program instructions executable by a processor, the program instructions comprising:
receiving, by one or more processors, a question that is to be processed by a group of query systems;
obtaining, by the one or more processors, a group of answers to the question from the group of query systems, wherein the group of answers comprise an answer to the question from each of the query systems associated with the group of query systems; and
determining, by the one or more processors, an association relationship between the question and a query system from the group of query systems, wherein the association relationship is determined using machine learning and based on an association between an attribute of the question and the query system of the group of query systems, wherein the attribute is selected from at least a field of the question, a location associated with the question, a time, and different combinations of attributes thereof associated with the question, and wherein the attribute is used for selecting the query system for answering the question and one or more further questions that are determined to be similar to the question; and
automatically determining a score for the association relationship corresponding to the query system based on one attribute and based on each of the different combinations of attributes, and automatically increasing or decreasing the score for the association relationship based on detected feedback;
receiving the one or more further questions;
determining, for each of the one or more further questions, which attributes are included in a further question from the one or more further questions, and automatically directing the further question to at least one query system from the group of query systems based on which of the attributes are included in the further question and based on determined scores for determined association relationships between the attributes and each query system from the group of query systems, wherein the automatically directing further comprises;
determining that the further question includes only a first attribute and that the score for the at least one query system is above a first threshold for the first attribute, and directing the further question to the at least one query system having the score above the first threshold for the first attribute;
determining that the further question includes the one or more of the different combinations of attributes, wherein the one or more of the different combinations of attributes comprises the first attribute, and that the score for the at least one query system is above a second threshold corresponding to the one or more different combinations of attributes, and directing the further question to the at least one query system having the score above the second threshold corresponding to the one or more different combinations of attributes; and
determining that the determined scores for each query system from the group of query systems is below the first threshold and the second threshold, and directing the one or more further questions to all query systems in the group of query systems in response to determining that the determined scores for each query system from the group of query systems is below the first threshold and the second threshold.

16. The computer program product of claim 15, wherein the determining the association relationship, further comprises:
determining a satisfaction level of a user to the answer from the detected feedback; and
determining the association between the attribute of the question and the query system from which the answer is provided based on the determined satisfaction level.

\* \* \* \* \*